United States Patent

[11] 3,615,975

[72] Inventors: Maurice F. Gillern;
Harlan G. Freeman, both of Seattle, Wash.
[21] Appl. No.: 821,567
[22] Filed: May 5, 1969
[45] Patented: Oct. 26, 1971
[73] Assignee: Weyerhauser Company
Tacoma, Wash.

[54] BONDING MATERIALS USING AMINE-MODIFIED ALDEHYDE CONDENSATION POLYMER, MIXTURE OF EPOXY RESIN AND METHYLENE DONOR, AND A FOAMING AGENT
18 Claims, 5 Drawing Figs.

[52] U.S. Cl. .................................................. 156/79,
156/310, 156/330, 156/331, 156/335, 161/161,
161/188, 260/2.5 EP, 260/2.5 F, 260/834,
260/849, 260/831
[51] Int. Cl. ...................................................... C09j 3/16
[50] Field of Search .......................................... 156/79,
331, 330, 335, 315; 161/161, 188; 260/2.5 EP, 2.5
F, 834, 849, 831

[56] References Cited
UNITED STATES PATENTS

| | | | |
|---|---|---|---|
| 2,839,487 | 6/1958 | Rosamilia et al. | 260/42 |
| 3,186,969 | 6/1965 | Cox et al. | 260/51.5 |
| 3,513,221 | 5/1970 | Huang et al. | 260/830 |
| 2,323,831 | 7/1943 | Menger et al. | 144/309 |
| 3,224,920 | 12/1965 | Bosworth | 156/315 |
| 3,320,087 | 5/1967 | Erickson | 117/137 |
| 3,415,714 | 12/1968 | Hider | 161/161 |
| 3,518,159 | 6/1970 | Freeman et al. | 161/258 |

OTHER REFERENCES

Fieser and Fieser, Organic Chemistry, 3rd Ed., p. 796, Reinhold Publishing Corporation, (1956), New York.

*Primary Examiner*—Carl D. Quarforth
*Assistant Examiner*—E. A. Miller
*Attorneys*—Patrick D. Coogan, John M. Crawford and Leslie G. Noller

ABSTRACT: A method of bonding materials, particularly wood, using foamed gap-filling adhesives is disclosed. The adhesives are prepared using amine-modified aldehyde condensation polymers in which a foaming agent or agents have been incorporated. The resins cure rapidly at ambient temperature and make excellent construction adhesives.

PATENTED OCT 26 1971  3,615,975
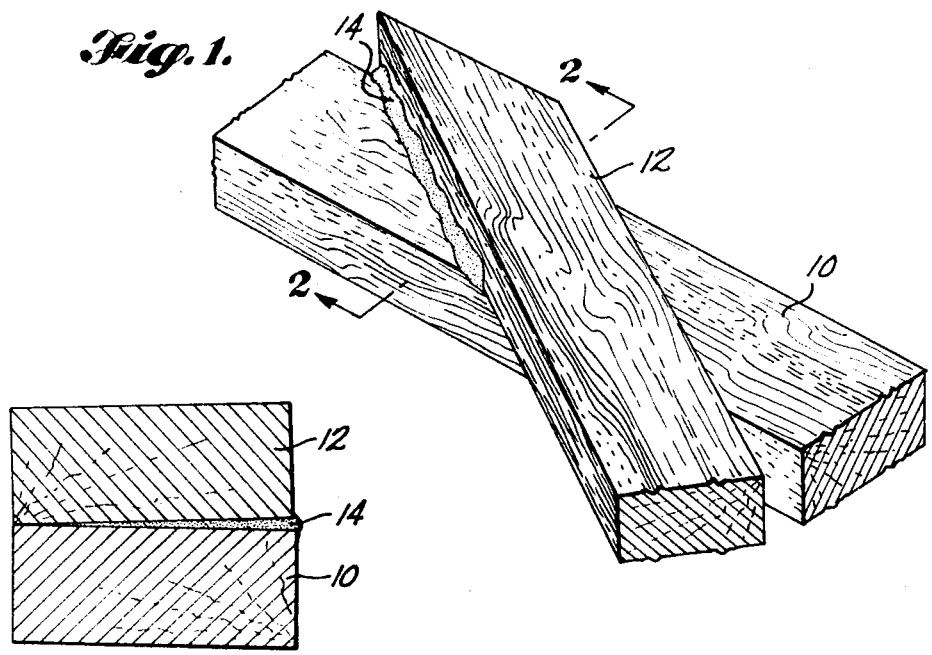
Fig. 1.
Fig. 2.
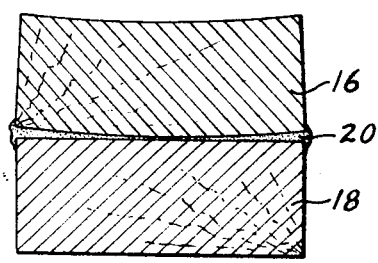
Fig. 3.
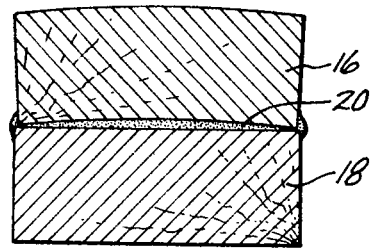
Fig. 4.
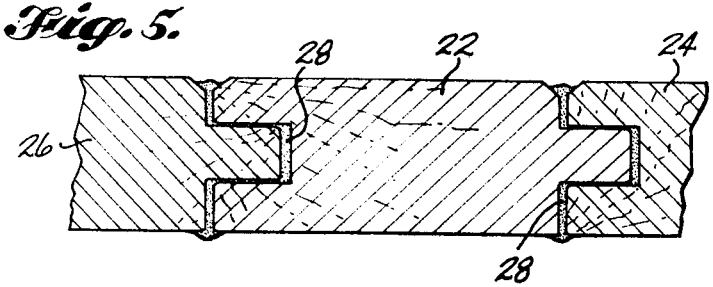
Fig. 5.
INVENTORS:
MAURICE F. GILLERN
HARLAN G. FREEMAN
BY
Seed Berry Dewey
ATTORNEYS

BONDING MATERIALS USING AMINE-MODIFIED ALDEHYDE CONDENSATION POLYMER, MIXTURE OF EPOXY RESIN AND METHYLENE DONOR, AND A FOAMING AGENT

BACKGROUND OF THE INVENTION

1. Field of the Invention

This invention relates to a method of bonding materials together using foamed adhesives employing amine-modified aldehyde condensation resins and to the foamed adhesive per se.

2. Prior Art Relating to the Disclosure

In the field of wood adhesives phenolic and urea aldehydes have been widely used. These resins, used in the manufacture of plywood and structural laminates, have limited application in construction applications where warped boards, rough wood surfaces, limited pressing equipment and unskilled labor are encountered. In most construction applications glue lines as thick as 0.125 inch may be encountered. Structural glue performance even with highly filled adhesives under these conditions has heretofore been unobtainable because of the shrinkage of the adhesive during curing and drying resulting in polymer cracking and crazing where glue lines greater than 0.016 inch are involved.

Epoxides, polyesters and polyurethane resins have been suggested as construction adhesives. Polyesters and polyurethanes, however, have relatively high shrinkage during curing. These resins also, because of their hydrophobic character, are not capable of wetting the wood to be bonded sufficiently to establish good bonding. In addition many of the epoxide and polyurethane resins employ toxic components which limit their practical use.

In formulating a "gap filling" adhesive for wood and wood products it is necessary that the adhesive composition be sufficiently fluid to wet the wood surfaces yet sufficiently viscous that a thick layer of adhesive can be established to bridge gaps occurring between the surfaces to be bonded.

This invention is directed to a method of bonding wood and other materials capable of bridging relatively wide gaps occurring in the glue lines between the surfaces to be bonded. The adhesive compositions are ideal for construction applications in that they are water dispersible and cure to an infusible state very rapidly at ambient temperature.

SUMMARY OF THE INVENTION

The main object of this invention is in a method of bonding materials, for example, wood and wood products, where glue lines thicker than 0.016 inch may be encountered. A further object is the formulation of adhesive compositions incorporating amine-modified aldehyde condensation polymers and a foaming agent or agents. The foamed adhesive compositions expand in the glue line filling any gaps between the surfaces of the materials being bonded together. Long clamping times under pressure, necessary for bonding materials together with many prior adhesives, are not needed. With the adhesives of this invention small amounts of pressure are sufficient and even contact pressure is adequate in many cases.

BRIEF DESCRIPTION OF THE DRAWINGS

FIG. 1 is an isometric view of two pieces of lumber bonded together with the foamed adhesive of this invention;

FIG. 2 is a cross-sectional view of two pieces of lumber bonded together with the foamed adhesive;

FIGS. 3 and 4 are cross-sectional views of warped boards bonded to a flat board, the foamed adhesive filling the gaps occurring between the boards;

FIG. 5 is a cross-sectional view of tongue and groove joints bonded together with the foamed adhesive.

DETAILED DESCRIPTION OF THE INVENTION

Foamed adhesives which are capable of bridging gaps ranging from 0.016 to 0.125 inch in construction work have to date been inadequate to overcome many of the problems inherent therein. The rapid-curing adhesives of this invention in which a foaming agent or agents are incorporated prior to or at the time the adhesive is to be used, make excellent construction adhesives in applications where thick glue lines are often found. The foaming agent or agents cause the adhesive to expand thereby bridging any gaps which generally occur in gluing of rough wood surfaces or warped boards. The foam is preferably of the closed-cell type.

The rapid-curing resins which can be employed as construction adhesives in the manner suggested are prepared using amine-modified aldehyde condensation polymers further reacted with an aldehyde donor or aldehyde-epoxide mixture. A foaming agent or agents are incorporated in the adhesive composition prior to cure.

The resins of this invention are usually prepared as two component resins. Each component by itself has a relatively long shelf life and is stable. On blending of the two components, however, the resulting composition cures very rapidly at ambient temperatures. To produce satisfactory foamed adhesives the foaming agents should be incorporated in one or both of the components or added simultaneously or substantially simultaneously on mixing of the components together.

The aldehyde condensation polymers which can be used in this invention are well known and commercially available. They include such resins as the acid or base-catalyzed phenolic-aldehyde resins, urea-aldehyde resins, melamine-formaldehyde resins, acetone-formaldehyde resins, etc. The following references disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press, Inc., New York, 1958; "Aminoplasts by C. P. Vale, Cleaver-Hume Press, Ltd., London England and British Pat. No. 480,316. Specifically condensation resins of formaldehyde with phenol, phenol-resorcinol, resorcinol, acetone, urea, melamine-urea, and melamine may be used. The preferred resins are water soluble, liquid, thermosetting phenol-aldehyde resins of the novolac or resole types. Such resins are generally prepared by condensation of one mole of a monohydric phenol with 0.7 to 2.5 moles of formaldehyde. The phenolic resins are condensed under acid or alkaline conditions. Other phenolic polymers, primarily those having a predominately ortho-condensed molecular structure may be used. These resins are prepared by condensing 0.7 to 1.0 mole formaldehyde with 1 mole phenol in the presence of an ortho-directing catalyst such as calcium acetate. Although phenol is the preferred reactant, the phenolic resins may be modified by incorporating into them predetermined amounts of dihydric phenols such as resorcinol or other polyhydroxy aromatic compounds.

The first component of the two-component resin is made by reacting the aldehyde condensation polymers described with an amine or amines of a particular type. The amount of amine used to react with the aldehyde condensation polymer should range from about 0.05 to 2.0 parts by weight of the amine to each part by weight of the condensation polymer. Preferably 0.1 to 1.0 parts by weight of the amine to each part by weight of the condensation polymer is used. More than 2.0 parts by weight of the amine to each part of the aldehyde condensation polymer can be used but there is little advantage in doing so.

The amines useful for modifying the aldehyde condensation polymers include amines of the following types:

1. primary aromatic means having the formula:

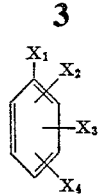

where:
$X_1$ is $-NH_2$, $X_2$ is $-X_1$, $X_3$ is $-X_1$, $X_4$ is $C_1$ to $C_4$ alkyl
$-CH_2NH_2$ $-OH$ $-COOH$ $-H$
$-OCH_3$ $-NO_2$
$-OCH_3$
$-OH$
$-CH_3$
$-NHCOCH_3$
$-H$
$-A$ and

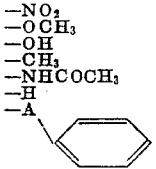

where $Y_1$ and $Y_2$ are hydrogen or alkyl radicals having from 1 to 3 carbon atoms and Z is an integer from 0 to 2.

2. bis(aminoaryl) compounds having the formula:

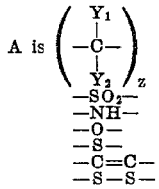

where R and R′ are alkoxy, amino, hydrogen, hydroxyl, nitro, carboxyl or $C_1$ to $C_4$ alkyl
and X is

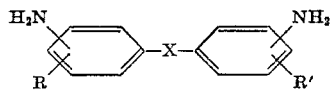

where $Y_1$ and $Y_2$ are hydrogen or alkyl radicals having from 1 to 3 carbon atoms and Z is an integer ranging from 0 to 2;

(3) Aminonaphthalenes of the formula:

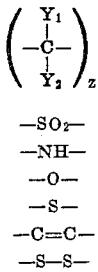

where R may be amino in any open ring position or hydroxyl in the 2, 5 and 8 ring positions when the amino group is in the 1 position; and 4. heterocyclic nitrogen-containing compounds selected from the group consisting of 2,3-, 2,4-, 2,6- or 3,4-diaminopyridine; pyrrole; N-methylpyrrole; 2,4-dimethylpyrrole; or 4,6-diaminopyrimidine.

Exemplary of the specific amine compounds which can be used to modify the phenolic polymers are the following:

4-aminosalicyclic acid
3,5-diaminobenzoic acid
o-hydroxyaniline
m-hydroxyaniline
o-phenylenediamine
m-phenylenediamine
p-phenylenediamine
1,2,4-triaminobenzene
1,3,5-triaminobenzene
2-amino-5-nitrophenol
2-aminoresorcinol
m-methoxyaniline
2,4,6-triaminotoluene
2,4-diaminodiphenylamine
1,3-diamino-4-methoxybenzene
1,3-diamino-4-nitrobenzene
1,4-diamino-2-nitrobenzene
2,4-diaminophenol
2,4-diaminotoluene
2,4-diaminoacetanilide
m-xylylenediamine
3,3′-dimethoxybenzidine
4,4′-oxydianiline
o-tolidine
4,4′-diaminodiphenylmethane
4,4′-diaminodiphenylsulfone
3,3′-diaminobenzidine
4,4′-diaminodiphenylamine
4,4′-diaminostilbene
4,4′-methylenedianiline
4,4′-diaminodiphenyldisulfide
1,5-diaminonaphthalene
1,8-diaminonaphthalene
1-amino-5-naphthol
1-amino-2-naphthol
2,7-diaminonaphthalene
1,2-diaminonaphthalene
2,3-diaminopyridine
2,4-diaminopyridine
2,6-diaminopyridine
3,4-diaminopyridine
N-methylpyrrole
pyrrole
4,6-diaminopyrimidine
2,4-dimethylpyrrole The preferred amines used in preparation of the foamed adhesives of this invention include m-phenylenediamine, m-hydroxyaniline, 1,5-diaminonaphthalene, 2,6-diaminopyridine and 4,4′-methylene-dianiline.

The first resin component or amine-modified adduct is prepared by reacting an amine compound with the aldehyde condensation polymer usually under reflux conditions, in the presence of a small amount of water, methanol, water-methanol mixture, or other suitable carrier. As some of the reactions are exothermic in nature, cooling is often required.

The second component of the resin is either an aldehyde or other methylene group donor or aldehyde-epoxide mixture wherein the epoxide compound used has more than one terminal epoxide group per molecule. When the first and second components are blended together the mixture gels rapidly to an infusible state at ambient temperature.

When aldehyde alone is used it is added to the amine-modified adduct to form an infusible product. The amount of aldehyde hardener is not particularly critical and may range from 0.02 to 1.0 parts by weight aldehyde per part of amine-modified condensation polymer. The preferred aldehyde is formaldehyde as well as the formaldehyde-forming compounds trioxane and paraformaldehyde. Other aldehydes may be used, however, for example, aliphatic or cyclic aldehydes having from one to eight carbon atoms such as glyoxal, acetaldehyde, propionaldehyde, butyraldehyde and furfuraldehyde.

It is advantageous to add epoxide compounds which have more than one epoxide group per molecule along with the aldehyde. The resins modified with an epoxide compound are characterized by greater flexibility and less shrinkage on curing. The epoxide compound can constitute as little as 10 parts by weight or as much as 50 parts by weight to about 90 to 50 parts by weight of the amine-modified polymer.

A wide variety of epoxide compounds can be used to prepare the resin composition for this invention. The useful epoxides are those having more than one terminal epoxide group per molecule. They can be saturated or unsaturated, aliphatic, cycloaliphatic, aromatic, heterocyclic, and monomeric or polymeric in nature. The polyepoxide resins include alicyclic polyepoxides such as vinyl cyclohexene dioxides, limonene dioxide, dicyclopentadiene oxide, ethyleneglycol-bis(3,4-expoxy-tetrahydro-dicyclopentadiene-8-yl)-glycidyl ether; epoxidized polybutadienes or copolymers of butadiene with ethylenically unsaturated compounds such as styrene or vinyl acetate; compounds containing two epoxycyclohexyl residues such as diethylene glycol-bis-(3,4-epoxy-cyclohexane-carboxylate), bis-3,4-epoxy-cyclohexylmethyl succinate, 3,4-epoxy 6-methylcyclohexylmethyl-3,4-epoxy-6-methylcyclohexane-carboxylate, and 3,4-epoxy-hexahydrobenzal-3,4-epoxy-cyclohexane-1,1-dimethanol. Epoxidized esters, for example, epoxidized unsaturated vegetable oils, epoxidized soy bean oil, and epoxidized glycerol trilinoleate may be used. Also polymers and copolymers of vinyl polymerizable monoepoxides such as allyl glycidyl ether, glycidyl acrylate and glycidyl methacrylate may be used. Polyglycidyl esters resulting from the reaction of a dicarboxylic acid with epichlorohydrin or glycerol dichlorohydrin in the presence of an alkali may also be used. These polyesters are derived from aliphatic dicarboxylic acids such as succinic or adipic acid or from aromatic dicarboxylic acids such as phthalic or terephthalic.

Additional polyepoxides used in the composition of this invention include glycidyl ethers of polyhydric phenols obtained by reacting a polyhydric phenol with an excess of epichlorohydrin in the presence of sodium hydroxide. Such polyhydric phenols include bisphenol "A"(2,2-bis[p-hydroxyphenyl]propane), resorcinol, hydroquinone,4,4'-dihydroxybenzophenone, bis(4-hydroxyphenyl) ethane, 1,5-dihydroxynaphthalene, 4,4'-dihydroxy-biphenyl and condensation products of phenol with formaldehyde such as resoles or novolacs containing more than two phenol moieties linked to methylene bridges, and the like. Also polyglycidyl ethers of polyhydric alcohols may be used. These are made by reacting a polyhydric alcohol and epichlorohydrin with an acidic catalyst such as boron trifluoride and subsequently treating the resulting product with an alkaline material. Included among the polyhydric alcohols that can be used in the preparation of these polyepoxides are glycerine, ethyleneglycol, propyleneglycol, diethyleneglycol, hexanetriol, pentaerythritol, trimethylolethane, trimethylolpropane, and polyhydric ether alcohols such as diglycerol, dipentaerythritol, polyalkylene glycols and hydroxyethers of the aforementioned polyhydric phenols.

Other polyepoxide resins useful in this invention are described in "Handbook of Epoxy Resins" by Lee and Neville, McGraw-Hill Book Company, Incorporated, 1967.

Care is required in the preparation of the foam products using the rapid curing amine-modified compositions described herein. A foaming agent or agents in the desired proportions are rapidly and thoroughly intermixed with the liquid resin. As has been described when the two components making up the resins are blended together reaction takes place transforming the liquid resinous compositions into an infusible state within minutes. Therefore, the foaming agent must be either blended with one or both of the components of the adhesive mixture or simultaneously blended with the resin mixture at substantially the same time that the two components are brought together. Other conventional additives such as inert fillers, silicone fluids to control cell structure, surface active agents, etc., may be incorporated into the foam formulation by conventional techniques recognizing however, that a proper balance of physical and chemical properties needed for foaming is dictated by the amount of these additives used.

The foaming agents which may be used to foam the amine-modified resins of this invention include carbon dioxide liberating materials, low boiling aliphatic hydrocarbons, polyhalogenated saturated fluorocarbons and ethers. Exemplary of carbon dioxide liberating compounds are sodium bicarbonate and calcium carbonate which, in the presence of acid, liberate carbon dioxide. Fluorocarbons which may be used include monochlorodifluoromethane, dichlorodifluoromethane, 1,2-dichloro-1,1,2,2-tetrafluoroethane, 1,1,1-trichloro-2,2,2-trifluoroethane, 1,2-difluoroethane, and trichlorofluoromethane. The compounds should have boiling points ranging from about 0° to 100° C. Among the fluorohalohydrocarbons, trichlorofluoromethane is preferred.

The quantity of foaming agent required to produce a suitable adhesive foam varies with the particular foaming agents used. For most purposes the incorporation of 2 to 50 parts foaming agent per 100 parts per weight of the adhesive composition is preferred.

The viscosity of the resin or resin mixture into which the foaming agent is incorporated should range from about 200 to 300,000 centipoises. If the viscosity is too low, there is a tendency for the foaming agents to volatize in the form of large bubbles and cause frothing of the resinous mass with evolution of a great amount of the foaming agent. The viscosity range required for a particular foaming agent used can be determined by one skilled in the art.

On blending of the foaming agent into the adhesive composition the reaction mixture may be heated a slight amount to promote volatilization of the foaming agent. If a carbon dioxide liberating material is used such as calcium carbonate or sodium bicarbonate sufficient acid is added to one or both of the components of the adhesive composition for reaction with the carbon dioxide liberating compound.

FIGS. 1 to 5 illustrate the gap-filling qualities of the foamed adhesives. In most construction applications the wood to be bonded together is either warped or has such a rough surface that the two surfaces to be bonded cannot be made to coincide without elaborate pressing equipment such as used in the production of laminated beams. The foamed adhesives described herein fill any gaps occurring between the surfaces to be bonded. FIG. 1 illustrates the manner in which the foamed adhesives can be used in the manufacture of, for example, roof trusses for domestic housing. A piece of lumber 10 is bonded at an angle to a second piece of lumber 12 by the foamed adhesive 14. FIG. 2 shows the glue line between the two pieces of lumber in cross section illustrating how the foamed adhesive fills any gaps between the surfaces of the lumber to be bonded. FIGS. 3 and 4 illustrate the gap-filling qualities of the foamed adhesives in bonding warped or bowed pieces of wood 16 to flat pieces of wood 18, the foamed adhesive bridging the gaps 20 between the bonded surfaces. FIG. 5 illustrates bonding tongue and groove members 22, 24 and 26 by the foamed adhesives described, the adhesive bridging the gap 28 between the bonded surfaces.

The following examples show the bonding of wood products with foamed adhesives made according to the invention.

EXAMPLE 1

A m-hydroxyaniline-modified phenol-formaldehyde polymer was prepared by charging a reactor with the following components:

45.18 parts phenol, 100 percent
12.26 parts flake paraformaldehyde, 91 percent
4.74 parts water
0.50 parts calcium acetate monohydrate.

Agitation was applied and the mixture heated to reflux (110° C.) in 60 minutes and held under reflux conditions for about 2 hours. The mixture was then slightly cooled and 20.83 parts of m-hydroxyaniline added. The mixture was then again heated to reflux (110° C.) and held for 2½ hours and then cooled to about 60° C. Methanol, 16.49 parts, was added. The cooling was then continued until room temperature was reached.

A two-component adhesive was prepared with the two components having the following formulation:

| Component A | Wt. % |
| --- | --- |
| Meta-hydroxyaniline resin described above | 95.04 |
| Concentrated hydrochloric acid | 3.48 |
| Asbestos | 1.48 |
| Component B | |

| | |
|---|---|
| 55% formaldehyde in methanol-water solution | 46.72 |
| Calcium carbonate | 4.68 |
| Silica (Cab-o-sil) | 1.39 |
| Asbestos | 0.49 |
| Epoxide resin (ERL 3794–Union Carbide)- a polyglycidyl ether of phenol-formaldehyde novolac blended with diglycidyl ether of bisphenol "A" having an epoxy equivalent wt. of 174–186 and a viscosity of 7000–19,000 cps. at 25° C. | 46.72 |

Two parts by weight of Component A were mixed with one part by weight of Component B to give a foamed adhesive, the calcium carbonate reacting with the hydrochloric acid to liberate carbon dioxide. The adhesive foam had excellent utility as a construction adhesive as indicated below.

EXAMPLE 2

Douglas fir laminated beams were prepared using the foamed adhesive of example 1 and according to ASTM D 2559–66T. This is a method for testing adhesives for structural laminated wood products for use under exterior conditions. It is carried out by (1) laminating three, six-ply pieces of wood of a particular size together with the adhesive, (2) conditioning the laminated wood members, (3) cutting the laminated wood members into sections, and (4) utilizing the sections for determination of resistance to shear stresses. The test additionally submits specimens to a severe accelerated weathering test. This consists of a cyclical water-submerged vacuum-pressure-steam-oven-drying treatment to determine any glue line delamination.

Douglas-fir blocks, 6 inch ×1 inch ×24 inch were laid up one glue line at a time using a spread of 100 lbs. per 1,000 sq. ft. and a pressure of 5.3 lbs. per square inch. Component A and Component B of the adhesive composition of example 1 were blended together and rapidly spread on the surface of the board to be laminated. Two boards were pressed together and the glue line allowed to cure for 5 minutes before the block was removed from a jig having seven toggle clamps. The next glue line was then laid up immediately and the procedure continued until a six-ply beam section was completed.

After three beams had been assembled in the manner described they were placed in a 65 percent relative humidity room and allowed to condition for 3 days. They were then tested for shear strength and delamination under accelerated aging conditions by test method ASTM D2559–66T. The average percent delamination based on 50 inches of glue line per specimen was 4.12 percent, exceeding the minimum requirements for soft wood.

Block shear tests on the six-ply Douglas-fir laminates gave an overall average of 1,440 p.s.i. shear strength and 80 percent wood failure.

EXAMPLE 3

A two-component adhesive was prepared as described in example 1 using as the epoxy resin an epoxidized phenol-formaldehyde novolac having an average of 2.2 epoxy groups per molecule (DEN 431—Dow Chemical Co.) instead of the epoxide resin described in example 1.

The first and second adhesive components were mixed and spread on both faces of a number of ¾ inch ×5¾ inch × 8 inch Douglas-fir pieces conditioned to 10–11 percent moisture content. Metal shims of varying thicknesses were placed in the glue lines between the pieces of wood to create a "gap" between the wood surfaces. The following bonding conditions were used:

| | |
|---|---|
| Open assembly time | 15 seconds max. |
| Closed assembly time | 5 seconds max. |
| Pressure | 5 p.s.i. |
| Conditioning time before testing | 2 weeks |

The dry block shear strength and percent wood failure of the bonded Douglas-fir pieces was then measured by standard procedures. The average results are given in Table 1:

| Shim Thickness, Inches | Actual Measured Glue line Thickness, Inches | Dry Block Shear Strength, p.s.i. | % Wood Failure |
|---|---|---|---|
| None | 0.006 | 1830 | 80.0 |
| 0.025 | 0.025–0.035 | 1005 | 0.0 |
| 0.068 | 0.065–0.067 | 675 | 0.0 |

These strength values for the wide glue lines of this example are far higher than those that would be expected from past experience using previously known adhesives.

EXAMPLE 4

Three 2½ inch × 12 inch Douglas-fir wood blocks were spread with a blended two-component adhesive at a spread weight of 75 pounds per 1,000 board feet of single glue line and pressed at 150 p.s.i. for 30 minutes. The assembly time was about 10 seconds. Component A of the adhesive was the same as that used in example 1 and Component B the same as in example 1 with the epoxy resin omitted. Two parts by weight of Component A were blended with 1 part by weight of Component B. The average dry block shear strength and percent wood failure of the bonded Douglas-fir pieces was 750 p.s.i. and 13 percent respectively.

EXAMPLE 5

Three wood blocks of the same size and type as described in example 4 were bonded together with an adhesive composition composed of 2 parts by weight of Component A OF example 1 AND 1 part by weight of Component B having the following composition:

| | |
|---|---|
| 55% formaldehyde in methanol-water solution | 87.29 wt. % |
| Silica (Cab-o-sil) | 2.62 wt. % |
| Asbestos | 1.48 wt. % |
| Trichlorofluoromethane | 8.79 wt. % |

The average dry block shear strength and percent wood failure of the bonded Douglas-fir pieces was 1,281 p.s.i. and 55 percent respectively.

EXAMPLE 6

Three wood blocks were bonded together as described in example 4 using an adhesive component of 2 parts by weight of Component A made up of 93.33 wt. percent m-hydroxyaniline resin similar to that prepared in example 1, 3.48 wt. percent concentrated hydrochloric acid (38 percent) and 1.48 wt. percent asbestos; and 1 part by weight of Component B of example 1. The average dry block shear strength and percent wood failure of the bonded wood pieces was 1,323 p.s.i. and 53 percent respectively.

What is claimed is:
1. A process of bonding a surface of a first material to a surface of a second material comprising:
   A. applying to said surface of said first material a foamable, rapid curing adhesive composition consisting essentially of
      1. the reaction product of 1 part by weight of an aldehyde condensation polymer and at least 0.05 parts by weight of an amine selected from the group consisting of
         a. primary aromatic amines having the formula:

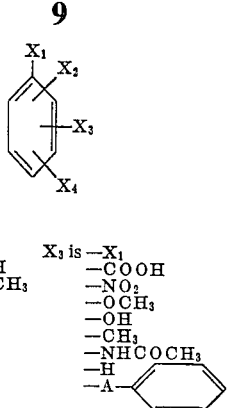

where:

$X_1$ is —NH$_2$    $X_2$ is $X_1$—    $X_3$ is —$X_1$    $X_4$ is $C_1$ to
—CH$_2$NH$_2$          —OH          —COOH      —H
                     —OCH$_3$       —NO$_2$        $C_4$ alkyl
                                 —OCH$_3$
                                 —OH
                                 —CH$_3$
                                 —NHCOCH$_3$
                                 —H
                                 —A—

and A is 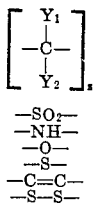

—SO$_2$—
—NH—
—O—
—S—
—C=C—
—S—S— where $Y_1$ and $Y_2$ are hydrogen or alkyl radicals having from 1 to 3 carbon atoms and Z is an integer from 0 to 2;

(b) Bis(aminoaryl) compounds having the formula:

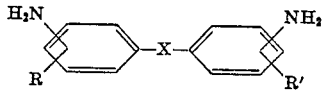

where R and R' are akloxy, amino, hydrogen, hydroxyl, nitro, carboxyl or $C_1$ to $C_4$ alkyl and X is 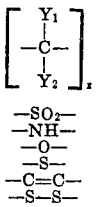

—SO$_2$—
—NH—
—O—
—S—
—C=C—
—S—S— where $Y_1$ and $Y_2$ are hydrogen or alkyl radicals having from 1 to 3 carbon atoms and Z is an integer ranging from 0 to 2;

(c) Aminonaphthalenes having the formula:

where R may be amino in any open ring position or hydroxyl in the 2, 5 and 8 ring positions when the amino group is in the 1 position; and d. heterocyclic nitrogen-containing compounds selected from the group consisting of N-methylpyrrole, 2,4-dimethylpyrrole, pyrrole; 2,3-; 2,4-; 2,6-; or 3,4-diaminopyridine, and 4,6-diaminopyrimidine;

2. a mixture of a methylene group donor and an epoxy resin having more than one epoxide group per molecule, said mixture being provided in an amount sufficient to cause said reaction product to become infusible; and 3. a foaming agent;

B. bringing said adhesive coated surface of said first material into contact with said surface of said second material, C. causing said foaming agent to expand said adhesive composition into a cellular foam before said adhesive cures to an infusible state, and D. curing said foamed adhesive to form an infusible cellular bonding material securely adhering said surfaces to one another.

2. The process according to claim 1 wherein said foaming agent is one selected from the group consisting of carbon dioxide liberating compounds, low boiling aliphatic hydrocarbons, low boiling ethers, and polyhalogenated saturated fluorocarbons.

3. The process according to claim 1 wherein said foaming agent comprises an alkali or alkaline earth carbonate which, in the presence of an acid, liberates carbon dioxide.

4. The process according to claim 1 wherein 2 to 50 parts by weight of the foaming agent are incorporated per 100 parts by weight of said reaction product and said mixture combined.

5. The process according to claim 1 wherein said aldehyde condensation polymer is one selected from the group consisting of formaldehyde condensed with phenol, urea, melamine-urea, acetone, melamine, phenol-resorcinol and resorcinol.

6. The process according to claim 1 wherein 0.05 to 2.0 parts by weight of said amine are reacted with 1 part by weight of said aldehyde condensation polymer.

7. The process according to claim 5 wherein said amine comprises m-phenylenediamine.

8. The process according to claim 5 wherein said amine comprises m-hydroxyaniline.

9. The process according to claim 5 wherein said amine comprises 1,5-diaminonaphthalene.

10. The process according to claim 5 wherein said amine comprises 2,6-diaminopyridine.

11. The process according to claim 5 wherein said amine comprises 4,4'methylenedianiline.

12. A process of bonding a surface of a first material to a surface of a second material at ambient temperature comprising:

a. coating said surface of said first material with a first resin component comprising
  1. an amine modified phenol-formaldehyde polymer prepared by reacting one part by weight of a phenol-formaldehyde resin with at least 0.05 parts by weight of an amine selected from the group consisting of m-phenylenediamine; m-hydroxyaniline; 4,4'-oxydianiline; 2,4-diaminoacetanilide; 1,5-diaminonaphthalene; 1,8-diaminonaphthalene; 3,5-diaminobenzoic acid; 2,5-diamino-pyridine; 1-amino-5-naphthol, and 4,4'-methylenedianiline; and
  2. a foaming agent, b. coating said surface of said second material with a second component comprising a mixture of a methylene group donor and an epoxy resin having more than one epoxide group per molecule; and c. bringing said resin coated surface of said first material into intimate contact with said coated surface of said second material to form a glue line therebetween, d. causing said foaming agent to expand the resulting adhesive composition into a cellular foam to fill gaps occurring in said glue line before said adhesive cures to an infusible state, and e. curing said foamed adhesive to form an infusible cellular bonding material securely adhering said surfaces to one another.

13. The process according to claim 12 wherein said amine comprises m-phenylenediamine.

14. The process according to claim 12 wherein said amine comprises m-hydroxyaniline.

15. The process according to claim 12 wherein said amine comprises 1,5-diaminonaphthalene.

16. The process according to claim 12 wherein said amine comprises 2,6-diaminopyridine.

17. The process according to claim 12 wherein said amine comprises 4,4-methylenedianiline.

18. The process of claim 1 wherein said first and second materials comprise wood.

* * * * *

PO-1050
(5/69)

UNITED STATES PATENT OFFICE
CERTIFICATE OF CORRECTION

Patent No. 3,615,975      Dated October 26, 1971

Inventor(s) Maurice F. Gillern and Harlan G. Freeman

It is certified that error appears in the above-identified patent and that said Letters Patent are hereby corrected as shown below:

In column 5, line 3, "expoxy" should read -- epoxy --;

In column 8, lines 10 through 14 should show four lines instead of three; those lines should read:

| None  | 0.005       | 1830 | 35.5 |
|-------|-------------|------|------|
| 0.010 | 0.010       | 1330 | 7.5  |
| 0.025 | 0.025-0.035 | 1005 | 0.0  |
| 0.068 | 0.065-0.067 | 675  | 0.0  |

In column 9, line 9, "$X_2$ is $X_1$-" should read -- $X_2$ is $-X_1$ --;

In column 10, line 68, "4,4-methylenedianiline." should read -- 4,4'-methylenedianiline. --.

Signed and sealed this 8th day of May 1973.

(SEAL)
Attest:

EDWARD M. FLETCHER, JR.
Attesting Officer

ROBERT GOTTSCHALK
Commissioner of Patents